Aug. 15, 1933.  F. A. DELANO  1,922,932
CORRUGATED TRANSPARENT MATERIAL
Filed May 16, 1930

Inventor
FREDERIC A. DELANO
By Semmes & Semmes
Attorney

Patented Aug. 15, 1933

1,922,932

UNITED STATES PATENT OFFICE 1,922,932

CORRUGATED TRANSPARENT MATERIAL

Frederic A. Delano, Washington, D. C.

Application May 16, 1930. Serial No. 452,992

7 Claims. (Cl. 88—60)

This application is a continuation in part of my application Serial No. 328,488, filed December 26, 1928.

My invention relates to transparent bodies, and more particularly to bodies of transparent material which permit an object to be clearly seen when viewed through said bodies in one direction, but cause an object to be distorted when viewed through the bodies in the opposite direction.

There are many places where natural light is desired together with privacy, not afforded by ordinary window glass. It is also oftimes desirable to clearly see objects without, from within an interior, and yet restrict the view into the interior from the outside, without diminishing the intensity of light transmitted through the vision restricting medium.

Heretofore, glass and other transparent materials have been treated in various manners to prevent objects being clearly seen therethrough. The products have been rather successful in preventing objects being seen through the material, but have the disadvantage of materially reducing the intensity of light transmitted therethrough. Also, as yet, no entirely satisfactory products have been prepared that permit an object to be clearly seen, when viewed through the material in one direction and cause the object to be distorted when viewed through the material in the other direction.

An object of this invention is to devise a sheet of transparent material, that will permit an object to be clearly seen when viewed through the sheet in one direction and will cause the object to appear distorted when viewed through the sheet of material in the opposite direction.

Another object of this invention is to construct sheets of transparent material that will restrict vision through the same, but will transmit light without detrimentally decreasing its intensity.

Another object of this invention is to construct sheets of transparent material that permit an object to be clearly seen through the material in one direction but cause an object to be distorted when seen through the material in the opposite direction, and yet produce sheets of material that will not retain dust and dirt and that can be easily cleaned.

Another object of this invention is to produce panes of glass or other transparent material having an irregular surface that may be easily formed during the manufacturing process.

With these and other objects in view which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

This invention comprises the formation of bodies of transparent material, such as glass, into sheets, one surface of which is plane and the other surface of which is irregular. The irregular surface is formed of a plurality of plane and curved surfaces in such a manner as to permit objects to be plainly seen through the sheets of transparent material, when viewed in one direction, and prevent objects being plainly seen through the material in the other direction. The surfaces forming the irregular surface are arranged at angles to each other in such a manner as to scatter the light rays passing through the sheets of material in one direction and thus cause objects seen therethrough to appear distorted.

This invention is also susceptible to modifications wherein concave and convex curved surfaces are employed. In these modifications all of the surfaces may be curved or the surface may comprise alternate plane and curved surfaces. Also, any desired combination of plane and curved surfaces may be employed.

In order to make my invention more clearly understood, I have shown in the accompanying drawing means for carrying the same into practical effect, without limiting the improvements in their useful applications to the particular constructions, which for the purpose of explanation, have been made the subject of illustration.

Figure 1:
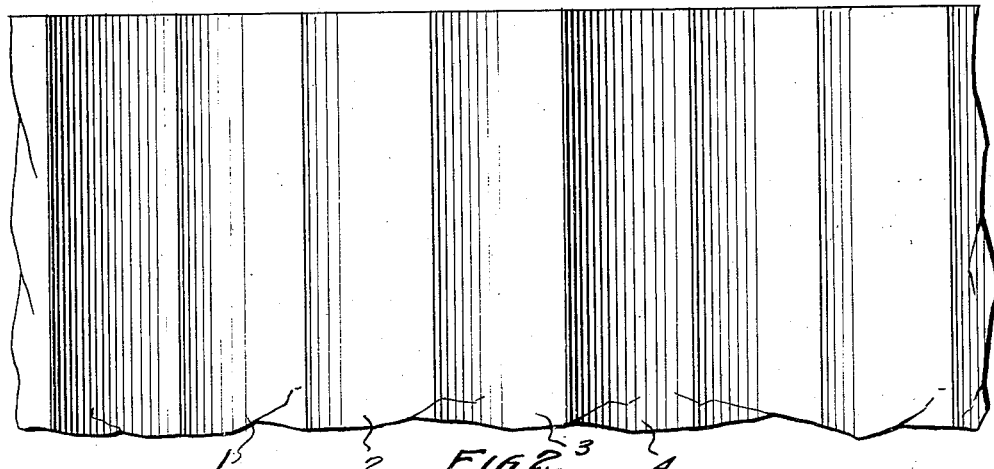
Figure 1 is a fragmentary plane view of a sheet of transparent material formed according to my invention.

While I have shown the plane surfaces in Figure 1 as being in a vertical plane, it is to be understood that this is merely for the purpose of illustration and the conservation of space. A transparent body constructed in accordance with my invention is placed in its receiving member in such a manner that the intersections of the contiguous cylindrical surfaces extend in a horizontal plane, the purpose of which will more fully hereinafter appear.

Figure 2:
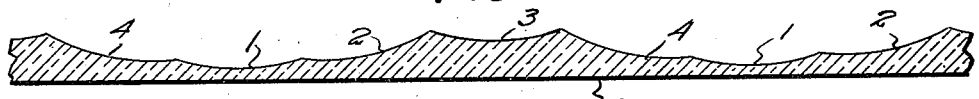
Figure 2 is a cross-sectional view of the sheet of material shown in Figure 1.

Referring to the drawing, Figures 1 and 2 show views of a fragment of a sheet of glass or other transparent material. It will be noted that one surface of the sheet of transparent material is flat and lies entirely in a single plane. The other side of the sheet of transparent material is not flat, but the surface thereof is corrugated as shown in the drawing.

By inspecting the several figures in the drawing, it can be seen that the corrugations are formed of a plurality of small surfaces, arranged angularly to each other. That is, the curved surfaces are arranged so that the chords thereof bear a definite relation to each other. In the form of my invention shown in Figures 1 and 2, the small surfaces are arranged in groups of four, each group comprising two concave curved surfaces, the chords of which are arranged parallel to the large flat surface 5, and two concave curved surfaces, the chords of which are arranged at an angle to the large surface 5.

The sheet of transparent material is so formed that the chord of surface 1 of each group is parallel to the large surface 5, and the material between surfaces 1 and 5 is relatively thin. Surface 3 is also arranged so that its chord is parallel with respect to the large surface 5, but the material between surfaces 3 and 5 is relatively thick as compared to the material between surfaces 1 and 5. The width of the small surfaces forming the corrugated side of the sheet, are all preferably of the same dimensions so as to form a pleasing appearance and to produce the desired effects.

Curved surface 2 lies between surfaces 1 and 3 of the group and has its chord angularly arranged thereto to properly connect these surfaces. Extending between the surface 3 of one group and the surface 1 of an adjacent group is the angularly arranged surface 4. Thus the corrugated surface is made up of groups of four concave curved surfaces, providing the whole surface with a plurality of small surfaces, alternate ones of which are generally parallel to the large plane surface 5.

Figure 3:
Figure 3 is a view similar to that shown in Figure 2, illustrating a modified form of my invention.

In Figure 3, I have shown a form of the present invention in which all of the small surfaces are convex. It will be noted that the arrangement of the surfaces in this figure is the same as that in Figure 2, the difference being in the type of curved surfaces employed. Parts in this figure corresponding to those shown in Figure 2, are indicated by corresponding reference numerals.

Figure 4:
Figure 4 is another view similar to that shown in Figure 2, illustrating another modified form of my invention.
Figure 5:
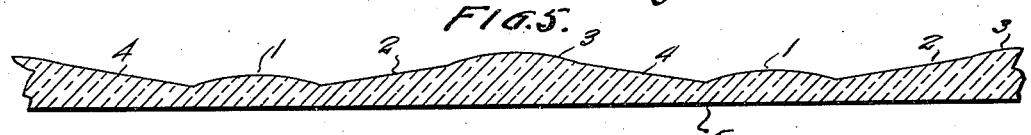
Figure 5 illustrates a further modification.
Figure 6:
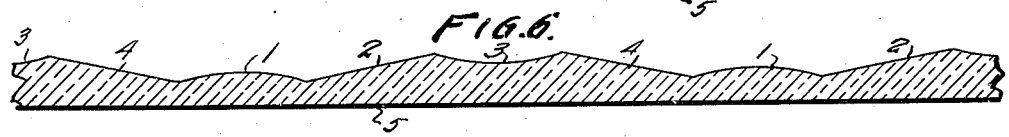
Figure 6 is a view similar to Figure 5, in which certain of the convex curved surfaces are substituted by concave surfaces.

It is also within the concept of the present invention to form the small surfaces of alternate curved and plane or flat sections. As shown in Figures 4, 5 and 6, alternate sections are flat. In Figure 4, the surfaces 1 and 3 parallel to the flat surface 5, are plane, whereas the other surfaces 2 and 4 are curved. A modification is shown in Figure 5, in which the surfaces 1 and 3 are curved and the surfaces 2 and 4 are plane.

To illustrate the susceptibility of the present invention to modification, I have shown in Figure 6 a further variation in which the surfaces 1 are formed as convex curves, the surfaces 3 as concave curves and the surfaces 2 and 4 as plane.

Figure 7:
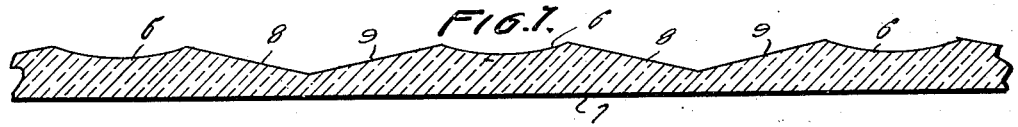
Figure 7 shows still another modifiaction of the present invention.

A somewhat modified form of my invention is shown in Figure 7. In this form of my invention, the narrow surfaces, forming the corrugated surface, are arranged in groups of three. The surfaces 6, parallel to the large plane surface 7, are separated from each other by a pair of angularly arranged surfaces 8 and 9. This form is somewhat similar to the form shown in Figure 2, except that the surfaces parallel to the large flat surface are separated by two angularly arranged surfaces.

Figure 8:
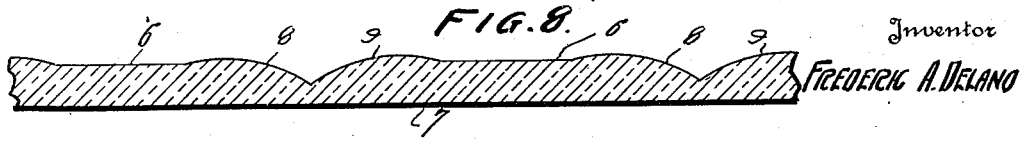
Figure 8 is a view of a still further modified form of the present invention.

I wish it to be understood that this form of my invention is susceptible to variation in that plane surfaces may be substituted for the curved surfaces and vice versa. For instance, as shown in Figure 8, surfaces 6 are plane and surfaces 8 and 9 are curved.

Further modifications of this invention consist in the substution of curved surfaces in place of the plane surfaces in each of the forms described and vice versa. The substitution may be for all of the surfaces or for any particular surfaces. For instance, alternate surfaces may be plane, and those connecting the plane surfaces curved, or, there may be two or more plane surfaces between curved surfaces or two or more curved surfaces between plane surfaces.

While certain surfaces have been arranged in groups for purposes of description, it is obvious that the surfaces of each form can be arranged in different group combinations.

In all of the forms of my invention, the width of the small surfaces of the corrugations is preferably though not necessarily equal, and the thickness of similar portions of the pane or sheet of material are equal, thus providing a uniform product which will produce the desired optical effects and be pleasing in appearance.

The angles between the small surfaces forming the corrugated surface, will vary, depending upon the results desired, and the refractive index of the transparent material employed.

The sheet of material may be constructed of the materials commonly used for window panes and other similar purposes, such as glass, and other transparent materials. The sheets of the transparent material may be formed by any of the methods employed for working similar materials, such as by molding, pressing, rolling or grinding.

In the operation of this invention, transparent material such as glass, constructed into one of the forms shown in the drawing, may be placed in windows, doors, partitions or other places, where needed. It is preferable to so place the panes that the corrugations will be arranged horizontally and so that the corrugated side will be on the inside of the room, or adjacent the person who wishes to see others without being clearly seen by other persons.

A person close to the window, such as one would be in a room, can look through the parallel portions of the glass and see objects on the outside, such as on the street, clearly; whereas people on the street cannot see into the room without the image of the person in the room appearing distorted. That is, a person standing close to the window with the eyes in a horizontal position will be looking through the same plane surface with both eyes and as a consequence the object will not be distorted. A person from a distance would, however, be looking through a number of plane surfaces resulting in the distortion of the object. Practically the same effect can be obtained with the other forms of my invention shown, because with the eye close to the window and on the corrugated side, the distortion effect does not operate as it does when an eye, at a distance and on the smooth side, looks through the window. The effects just described can be obtained with angles between the small surfaces, close to 180°.

Somewhat different results can be obtained by varying the angles between the small surfaces of the forms shown in figures of the drawing. By forming the material so that the surfaces 2, 4, 8 and 9 would be at an angle to the large flat surfaces, equal to the angle of total reflection, light from an object on the smooth side of the glass would be totally reflected by the angularly arranged surfaces, but would pass through the parallel surfaces undistorted. With such an arrangement, objects on the smooth side could be seen by an eye on the corrugated side and would appear as though a grating were in front of the object. Such a grating, however, would not prevent the object from being clearly distinguished.

When light from an object on the corrugated side falls on the sheet of material, the portion of the light passing through the angularly arranged surfaces interferes with that passing through the parallel surfaces, and the object appears highly distorted to an eye on the smooth side of the window.

It is obvious that my invention is susceptible to many modifications such as can be obtained by varying the relations and arrangements of the surfaces forming the corrugated surfaces.

For instance, plane surfaces may be substituted for any of the curved surfaces shown, convex curved surfaces may be substituted for any of the concave or plane surfaces shown, and concave surfaces may be substituted for any of the plane or convex surfaces shown.

Also, the invention contemplates a form in which all small plane surfaces and/or the chords of all curved surfaces are at an angle to the large plane surface.

The merits of my invention are obvious in that it provides sheets of transparent material which permit objects outside of a window to be fairly clearly seen, whereas objects inside the window cannot be seen from without except in a highly distorted condition. The products manufactured according to my invention successfully restrict the view through transparent material in one direction but permit light to pass therethrough without diminishing its intensity.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A one-way vision window pane consisting of a body of transparent material, one surface of which lies in a single plane, and the other surface of which comprises a plurality of angularly arranged cylindrical surfaces, which cylindrical surfaces extend uninterruptedly across one dimention of the window pane; the chords of certain of the cylindrical surfaces being substantially parallel to the said single plane surface, while the chords of other of said cylindrical surfaces are at an angle to the said plane surface, the said cylindrical surfaces of the chords of which are parallel to the plane surface being of sufficient width to permit clear vision therethrough when an observer is positioned relatively closely to the window but distorting vision when an observer is relatively distant from the window.

2. A one-way vision window pane consisting of a body of transparent material, one surface of which lies in a single plane, and the other surface of which comprises a plurality of cylindrical surfaces, the chords of some of which are parallel to the single plane surface, and others of which are arranged at an angle thereto the first said cylindrical surfaces being of sufficient width to permit vision therethrough when an observer is relatively close to the window pane.

3. A body of transparent material permitting one-way vision having a flat plane surface and a corrugated surface, the corrugations being formed of a plurality of cylindrical surfaces, alternate ones of which have their chords parallel with said flat surface said alternate surfaces being of sufficient width to permit undistorted vision therethrough when an observer is positioned relatively closely to the window pane.

4. A body of transparent material permitting one-way vision having a flat plane surface, and an irregular surface formed of a plurality of small plane surfaces and small curved surfaces of the same size, each of which is angularly arranged with respect to the adjacent small plane surfaces, and alternate ones of which are parallel the small plane surfaces being of sufficient width to permit undistorted vision therethrough when an observer is positioned relatively closely to the material.

5. A body of transparent material permitting one-way vision having a flat plane surface, and an irregular surface, said irregular surface comprising a plurality of small cylindrical surfaces, alternate ones of which are arranged so that their chords are angularly arranged with respect to said flat plane surface and the other of which cylindrical surfaces have their chords parallel to the said flat plane surface and which cylindrical surfaces are of sufficient width to permit undistorted vision therethrough when an observer is relatively close to the material.

6. A body of transparent material permitting one-way vision having a flat plane surface and an irregular surface comprising a plurality of small surfaces arranged in groups of three, each group comprising a plane surface parallel to said flat plane surface and two angularly arranged cylindrical surfaces tapering in the direction of said flat surface the said small plane surfaces being of sufficient width to permit undistorted vision therethrough when an observes is positioned relatively closely to the material.

7. A one-way vision window pane consisting of a body of transparent material, one surface of which lies in a flat plane, and the other surface of which comprises a plurality of alternately arranged plane and cylindrical surfaces, said alternate plane surfaces extending across one dimension of the window pane and being of sufficient width to permit undistorted vision therethrough when an observer is positioned relatively closely to the pane.

FREDERIC A. DELANO.